(12) United States Patent
Gotou et al.

(10) Patent No.: US 9,211,888 B2
(45) Date of Patent: Dec. 15, 2015

(54) VEHICLE CONTROL APPARATUS

(71) Applicant: DENSO CORPORATION, Kariya, Aichi-pref. (JP)

(72) Inventors: Takuya Gotou, Kariya (JP); Kazunari Izumi, Anjo (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/620,744

(22) Filed: Feb. 12, 2015

(65) Prior Publication Data
US 2015/0224985 A1 Aug. 13, 2015

(30) Foreign Application Priority Data
Feb. 12, 2014 (JP) .................. 2014-024485

(51) Int. Cl.
| | | |
|---|---|---|
| B60W 20/00 | (2006.01) | |
| F02N 11/04 | (2006.01) | |
| F02N 19/00 | (2010.01) | |
| B60W 10/06 | (2006.01) | |
| B60W 10/08 | (2006.01) | |

(52) U.S. Cl.
CPC .............. B60W 20/40 (2013.01); B60W 10/06 (2013.01); B60W 10/08 (2013.01); F02N 11/04 (2013.01); F02N 19/005 (2013.01); Y10S 903/93 (2013.01)

(58) Field of Classification Search
CPC ..... B60W 20/40; B60W 10/06; B60W 10/08; F02N 11/04; F02N 19/005; Y10S 903/93
See application file for complete search history.

(56) References Cited

U.S. PATENT DOCUMENTS

| | | | | |
|---|---|---|---|---|
| 2003/0163244 A1* | 8/2003 | Ando | .............. | B60K 6/24 701/112 |
| 2008/0077308 A1* | 3/2008 | Laubender | .............. | F02N 11/08 701/113 |
| 2008/0105230 A1* | 5/2008 | Kishibata | .............. | F02D 41/062 123/179.5 |
| 2009/0101090 A1* | 4/2009 | Kidooka | .............. | F01L 9/04 123/90.11 |
| 2009/0118914 A1* | 5/2009 | Schwenke | .............. | B60K 6/445 701/51 |
| 2010/0042311 A1* | 2/2010 | Nakai | .............. | F02D 41/062 701/112 |
| 2013/0080039 A1* | 3/2013 | Nakamoto | .............. | F02D 41/009 701/113 |
| 2013/0138328 A1* | 5/2013 | Shimo | .............. | F02D 41/062 701/104 |
| 2013/0328323 A1* | 12/2013 | Reik | .............. | B60K 6/48 290/38 B |

FOREIGN PATENT DOCUMENTS

JP 3896952 3/2007

* cited by examiner

*Primary Examiner* — James Trammell
*Assistant Examiner* — James E Stroud
(74) *Attorney, Agent, or Firm* — Nixon & Vanderhye P.C.

(57) ABSTRACT

A vehicle control apparatus includes an engine and a motor generator, and controls a hybrid vehicle in which the engine is started by starting torque outputted from the motor generator. The apparatus includes a prestart control section which makes the motor generator output prestart torque smaller than the starting torque before the engine is started by the starting torque, a balance determination section which determines whether or not compression torque caused by pressure in a cylinder of the engine and the prestart torque are balanced with each other, and a start-up control section which makes the motor generator output the starting torque, after the balance determination section determines that the compression torque and the prestart torque are balanced with each other.

7 Claims, 7 Drawing Sheets

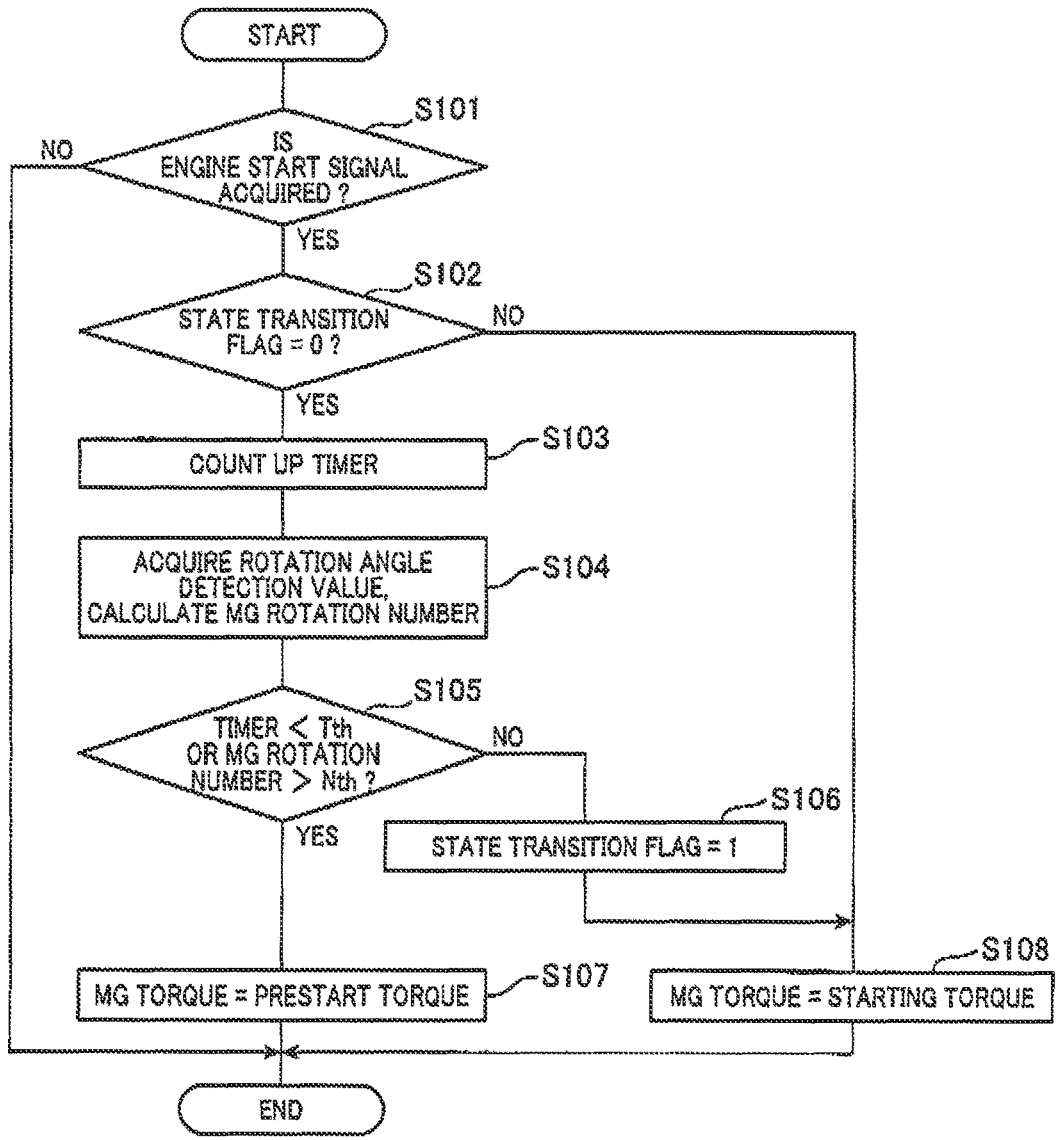

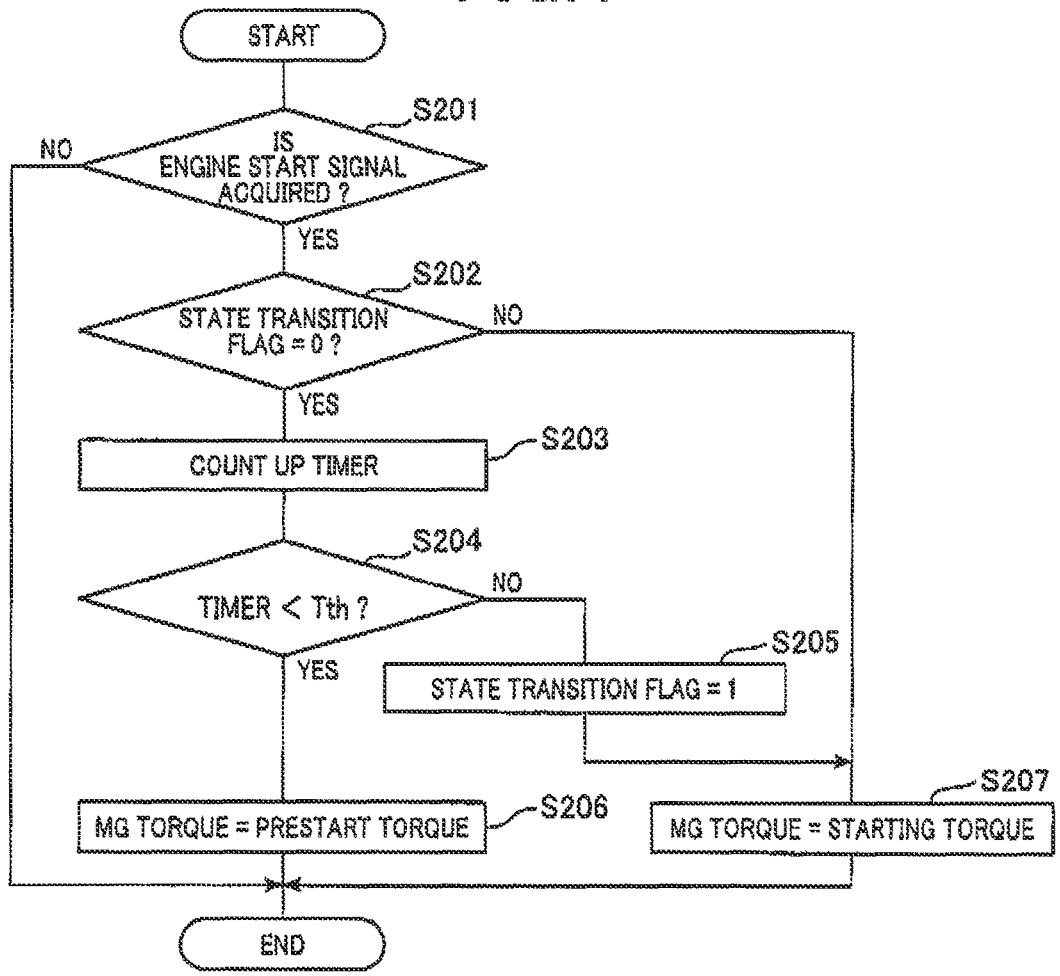

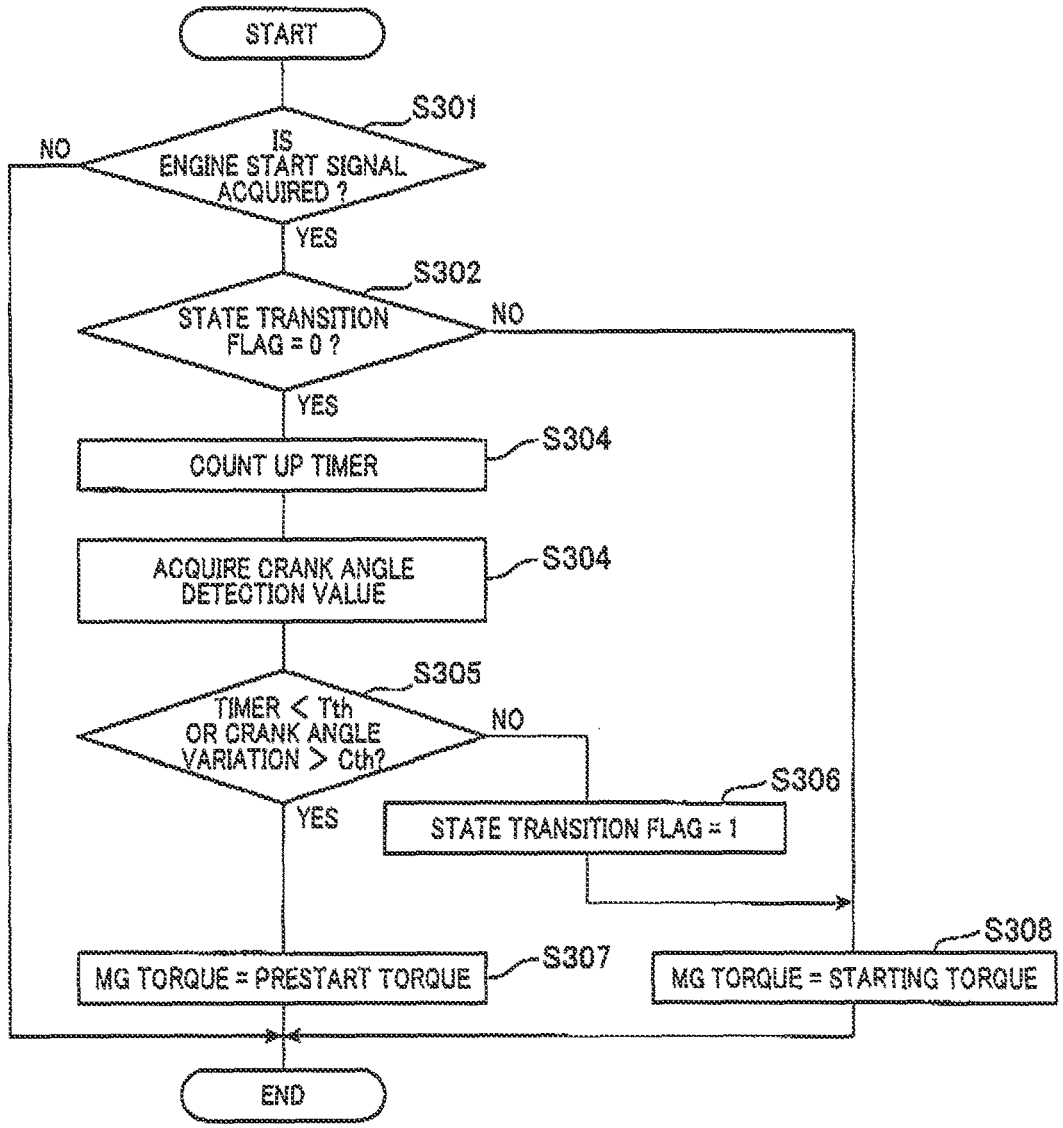

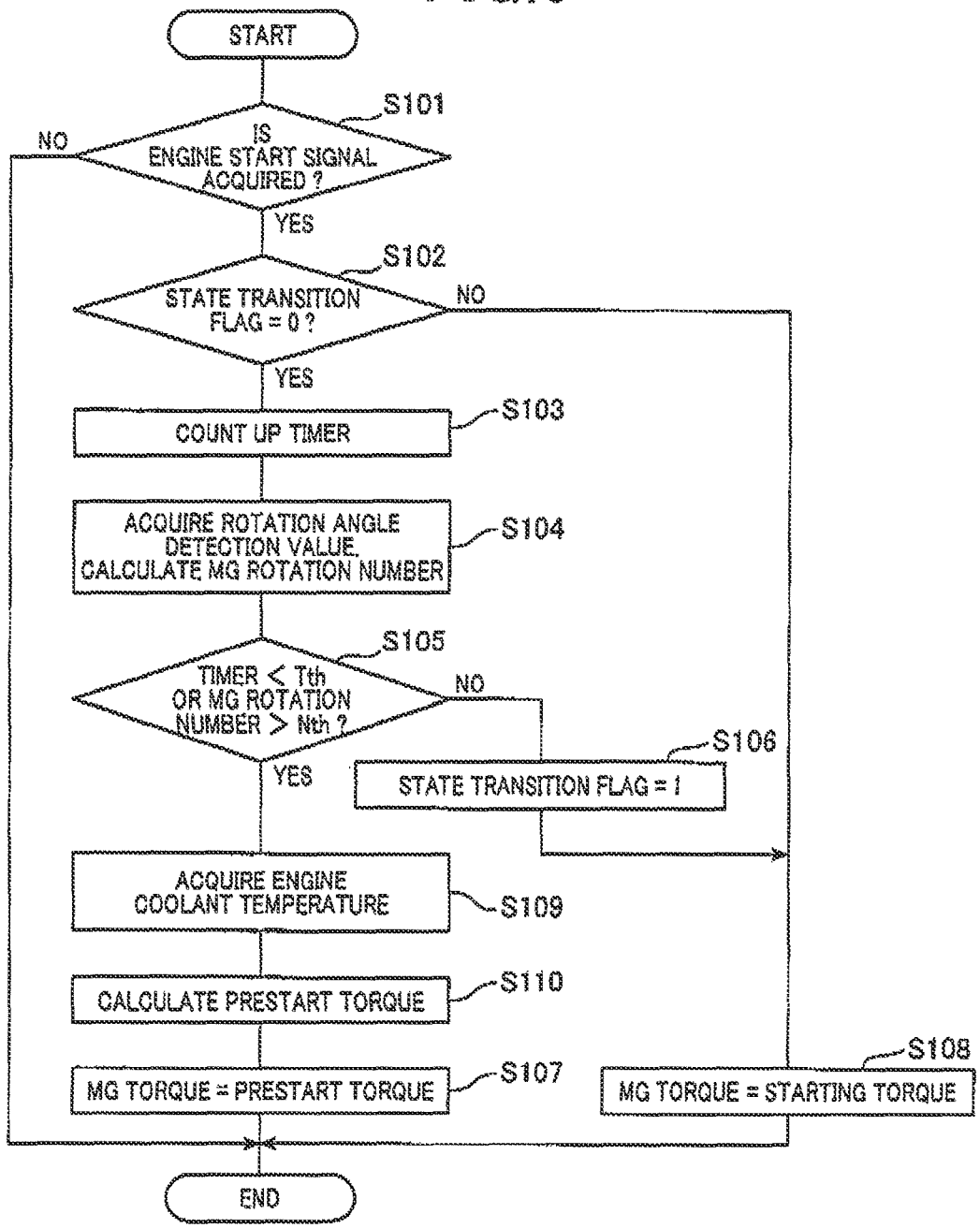

VEHICLE CONTROL APPARATUS

CROSS-REFERENCE TO RELATED APPLICATION

This application is based on and claims the benefit of priority from earlier Japanese Patent Application No. 2014-24485 filed Feb. 12, 2014, the description of which is incorporated herein by reference.

BACKGROUND

1. Technical Field

The present invention relates to a vehicle control apparatus.

2. Related Art

A hybrid vehicle is known which starts an engine thereof by using a motor generator. For example, in Japanese Patent No. 3896952, when stopping the engine, pistons are stopped at the top dead center or slightly advanced ignition timing with respect to the top dead center considering the next engine start, to quickly start the engine.

However, complicated control is required to reliably stop the pistons at predetermined positions. In addition, since a crankshaft may move between the time when the engine stops and the time later when the engine starts, the pistons are not necessarily kept at the predetermined stop positions when the engine starts.

SUMMARY

An embodiment provides a vehicle control apparatus which can reduce variation generated when an engine starts.

As an aspect of the embodiment, a vehicle control apparatus is provided which includes an engine and a motor generator, and controls a hybrid vehicle in which the engine is started by starting torque outputted from the motor generator, the apparatus including: a prestart control section which makes the motor generator output prestart torque smaller than the starting torque, before the engine is started by the starting torque; a balance determination section which determines whether or not compression torque caused by pressure in a cylinder of the engine and the prestart torque are balanced with each other, and a start-up control section which makes the motor generator output the starting torque, after the balance determination section determines that the compression torque and the prestart torque are balanced with each other.

BRIEF DESCRIPTION OF THE DRAWINGS

In the accompanying drawings:

FIG. 2 is a flowchart for explaining a start control process according to the first embodiment;

FIG. 4 is a flowchart for explaining a start control process according to a second embodiment;

FIG. 5 is a flowchart for explaining a start control process according to a third embodiment;

FIG. 6 is a flowchart for explaining a start control process according to a fourth embodiment.

DETAILED DESCRIPTION OF THE PREFERRED EMBODIMENTS

Figure 1:
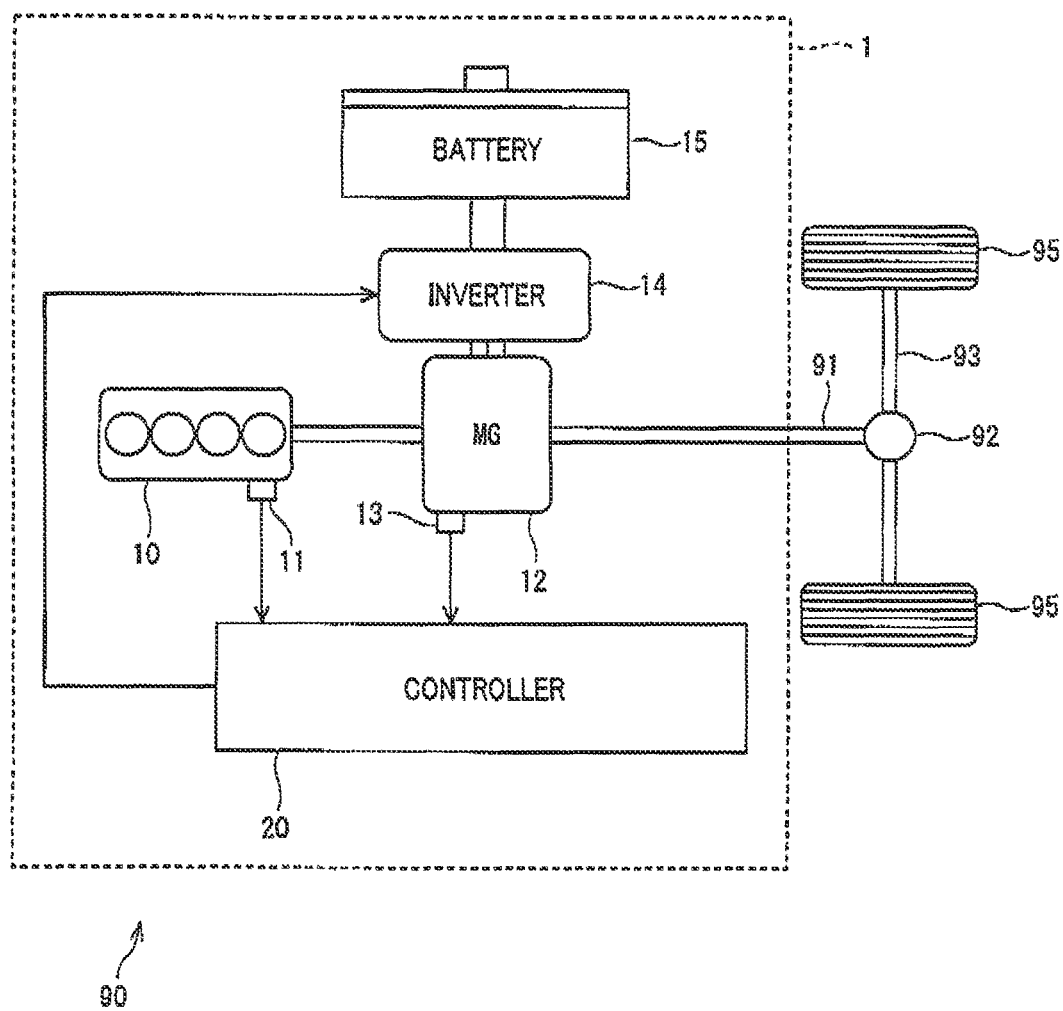
FIG. 1 is a diagram schematically showing an overall configuration of a vehicle control system according to a first embodiment.

With reference to the accompanying drawings, hereinafter are described embodiments of the present invention. Note that, in the following embodiments, the same reference numerals denote the substantially same parts.

First Embodiment

As shown in FIG. 1, a vehicle control system 1 includes an engine 10, a motor generator (hereinafter, referred to as "MG") 12, an inverter 14, a battery 15, controller 20 serving as a vehicle control apparatus, and the like. The engine 10 and the MG 12 configure a driving source of a vehicle 90, which is a hybrid vehicle.

The engine 10 is an internal-combustion engine having a plurality of cylinders. Each of the cylinders is provided with a piston reciprocating and sliding by rotation of a crankshaft. Driving force of the engine 10 is transferred to the motor generator 12 via a clutch and gears (not shown) and the like. In addition, the engine 10 is started by starting torque Qs outputted from the motor generator 12.

A crank angle sensor 11 detects a crank angle to output a crank angle detection value corresponding to the crank angle to the controller 20.

The MG 12 has a function of a traction motor which is rotated by being supplied with electric power from the battery 15 to generate torque, and a function of a generator which generates electric power by being driven by the engine 10 or by being driven by regenerative energy when the vehicle 90 is braking. A rotation angle sensor 13 detects a rotation angle of the MG 12 and outputs a rotation angle detection value corresponding to the rotation angle of the MG 12 to the controller 20. The rotation angle sensor 13 is a resolver.

Driving force of the engine 10 and the MG 12 is transferred to a drive shaft 91 via a clutch and a speed change gear (not shown) and the like. The driving force transferred to the drive shaft 91 rotates drive wheels 95 via a differential gear 92 and an axle shaft 93.

The inverter 14 is provided between the MG 12 and the battery 15. The inverter 14 converts electric power of the battery 15 to AC power and supplies the AC power to the MG 12. In addition, the inverter 14 converts electric power generated by the MG 12 to DC power and supplies the DC power to the battery 15.

The battery 15 is a secondary battery such as a nickel hydrogen battery and a lithium ion battery, which is chargeable and dischargeable. The battery 15 is charged and discharged so that a state of charge (SOC) falls within a predetermined range. Instead of the battery 15, chargeable/dischargeable devices such as an electric double layer capacitor may be used.

The controller 20 is configured with a microcomputer and the like. The controller 20 includes a CPU, a ROM, a RAM, an I/O, and a bus line connecting therebetween, which are not shown. The controller 20 is a so-called MG-ECU which controls the MG 12 by a software process or a hardware process. The CPU executes a previously stored program to perform the software process. A dedicated electronic circuit performs the hardware process.

In the present embodiment, the crankshaft is rotated by the starting torque Qs outputted from the MG 12 to start the engine 10. In addition, while the engine 10 is stopped, compression torque Qc due to pressure in a cylinder is applied to the pistons. The compression torque Qc varies with stop positions of the piston, the degree of opening/closing of an intake and exhaust valve, and the like. Hence, when the engine 10 is started by predetermined torque, vibration may be generated by torque variation due to the compression torque Qc.

Hence, in the present embodiment, to suppress the variation generated when the engine starts, before the engine 10 is started by the starting torque Qs, a prestart torque Qb, which is sufficiently smaller than the starting torque Qs, is applied to drive the piston to a position where the prestart torque Qb and the compression torque Qc are balanced with each other. Hereinafter, a state where the piston is stopped at the position, where the prestart torque Qb and the compression torque Qc are balanced with each other, is appropriately referred to as a state where compression is balanced.

Next, the start control process of the engine 10 is explained based on a flowchart shown in FIG. 2. This process is performed by the controller 20 at predetermined intervals until the start of the engine 10 is completed.

In step S101 (hereinafter, the wording "step" is omitted), the controller 20 determines whether or not an engine start signal indicating the start of the engine 10 is acquired. If determined that the engine start signal is not acquired (S101: NO), the controller 20 does not perform the following processes. If determined that the engine start signal is acquired (S101: YES), the start control process proceeds to step S102.

In step S102, the controller 20 determines whether or not a state transition flag is set which indicates that compression is balanced. In FIG. 2, a state where the state transition flag is not set is shown by 0, and a state where the state transition flag is set is shown by 1. If the controller 20 determines that the state transition flag is set (S102: NO), the start control process proceeds to step S108, if the controller 20 determines that the state transition flag is not set (S102: YES), the start control process proceeds to step S103.

In S103, the controller 20 counts up a timer. The count value of the timer corresponds to a period of time elapsed from the time when compression torque is outputted.

In S104, the controller 20 acquires a rotation angle detection value to calculate the MG rotation number based on the rotation angle detection value.

In S105, the controller 20 determines whether a count value of the timer is less than an elapsed time determination threshold value Tth or the MG rotation number is more than a rotation number determination threshold value Nth concerning MG rotation number. The elapsed time determination threshold value Tth is set to a period of time required for balancing compression. The rotation number determination threshold value Nth is set to a value by which compression can be considered to be balanced. If it is determined that the count value of the timer is not less than the elapsed time determination threshold value Tth and the MG rotation number is not more than the rotation number determination threshold value Nth (S105: NO), the controller 20 determines that compression is balanced. Next, in S106, the controller 20 sets the state transition flag. Then, the start control process proceeds to step S108. If it is determined that the count value of the timer is less than the elapsed time determination threshold value Tth or the MG rotation number is more than the rotation number determination threshold value Nth (S105: YES), the controller 20 determines that compression is not balanced. Then, the start control process proceeds to step S107.

In S107, the controller 20 uses the torque outputted from the MG 12 as the prestart torque Qb.

In S108, to which the start control process proceeds when the state transition flag is set (S102: NO, or S105: NO, S106), the controller 20 uses the torque outputted from the MG 12 as the starting torque Qs.

Figure 3A:
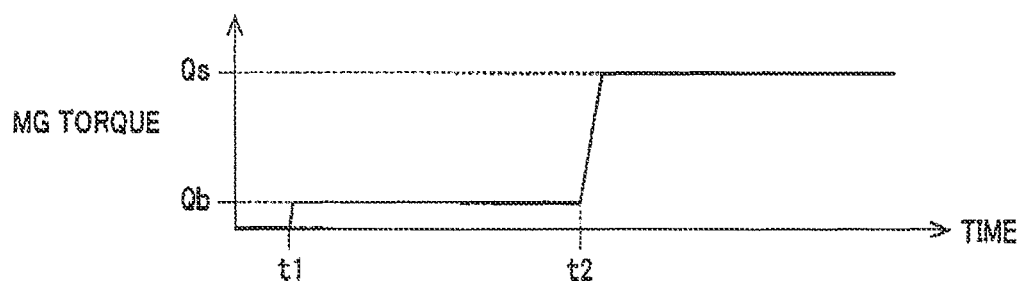
FIGS. 3A, 3B and 3C are time charts for explaining the start control process according to the first embodiment.
Figure 3B:
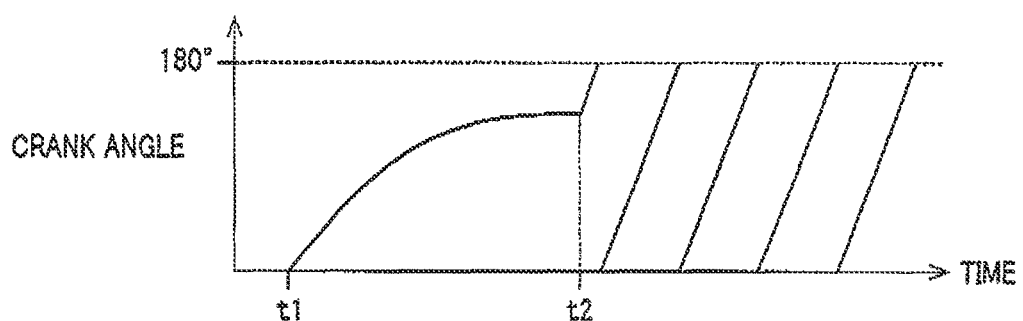
Figure 3C:
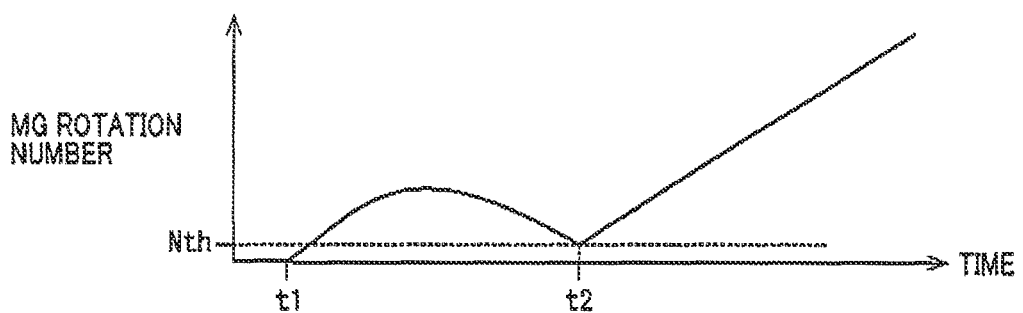

The start control process is explained with reference to FIGS. 3A, 3B and 3C. FIG. 3A shows MG torque. FIG. 3B shows crank angles of the engine 10. FIG. 3C shows the MG rotation number (number of rotations).

As shown in FIG. 3A, at time t1, when an engine start signal is acquired, the MG 12 outputs the prestart torque Qb. At this time, the compression torque Qc and the prestart torque Qb are not balanced with each other. The piston moves by differential torque between the compression torque Qc and the prestart torque Qb. Hence, as shown in FIG. 3B, the crank angle varies. If the compression torque Qc and the prestart torque Qb are balanced with each other, the piston stops. Hence, the crank angle does not vary.

In addition, as shown in FIG. 3C, the MG rotation number increases by the prestart torque Qb, and decreases as the compression torque Qc and the prestart torque Qb are balanced with each other. Hence, when the MG rotation number becomes equal to or less than the rotation number determination threshold value Nth, it is determined that the compression torque Qc and the prestart torque Qb are balanced with each other (S105: NO in FIG. 2).

Note that, immediately after the MG 12 starts, the MG rotation number is smaller. Hence, to prevent erroneous determination, it is considered that compression is balanced until a predetermined period of time is elapsed. Accordingly, the time t2 when MG torque is changed from the prestart torque Qb to the starting torque Qs is a time after a predetermined period of time is elapsed which corresponds to the elapsed time determination threshold value Tth concerning the count value of the timer.

If it is determined that the MG rotation number is not more than the rotation number determination threshold value Nth, the MG torque is changed from the prestart torque Qb to the starting torque Qs. When the prestart torque Qb is outputted from the MG 12, the crankshaft rotates at a predetermined rotation number. Hence, the crank angle varies at a predetermined rate. In addition, the MG rotation number increases at a predetermined rate. When the start of the engine 10 is completed, the start control process ends to shift to the engine control for traveling based on accelerator opening and vehicle speed.

According to the present embodiment, after the piston is moved to the position at which the prestart torque Qb and the compression torque Qc are balanced with each other, the crank shaft is rotated by the starting torque Qs. That is, in a state where the compression torque Qc and the prestart torque Qb are balanced with each other, the engine 10 is started by the starting torque Qs. Hence, torque variation due to the compression torque Qc can be suppressed. Thereby, shock and vibration can be reduced when the engine starts.

In addition, when the engine 10 starts, the piston is driven by the prestart torque Qb to the position where the prestart torque Qb and the compression torque Qc are balanced with each other. Hence, when the engine stops, complicated control is not required to stop the piston at a predetermined position considering the compression torque Qc.

As described above, the controller 20 controls the vehicle 90 including the engine 10 and the MG 12 as driving sources. The vehicle 90 can start the engine 10 by the starting torque Qs outputted from the MG 12.

Before the engine 10 is started by the starting torque Qs, the controller 20 makes the MG 12 output the prestart torque Qb smaller than the starting torque Qs (S107 in FIG. 2). In addition, the controller 20 determines whether or not the compression torque Qc caused by the pressure in a cylinder of the engine 10 and the prestart torque Qb are balanced with each other (S105). If the controller 20 determines that the compression torque Qc and the prestart torque Qb are balanced with each other (S105: NO), the controller 20 makes the MG 12 output the starting torque Qs (S108).

In the present embodiment, before the engine 10 is started by the starting torque Qs, the MG 12 outputs the prestart torque Qb to move the piston to the position where the prestart torque Qb and the compression torque Qc are balanced with each other. Then, the starting torque Qs is applied at the position where the prestart torque Qb and the compression torque Qc are balanced with each other. Hence, torque variation due to the compression torque Qc can be suppressed. Thereby, shock and vibration can be reduced when the engine starts.

According to the present embodiment, after an engine start signal indicating the start of the engine 10 is acquired (S101: YES), the controller 20 makes the MG 12 output the prestart torque Qb. Hence, compared with a case where the prestart torque Qb is outputted before the engine start signal is acquired, the period of time during which the prestart torque Qb is outputted can be shortened. Hence, the loss of the torque can be reduced.

In addition, the controller 20 acquires a rotation angle detection value from the rotation angle sensor 13 which detects a rotation angle of the MG 12 (S104) to determine whether or not the compression torque Qc and the prestart torque Qb are balanced with each other based on the rotation angle detection value (S105). Specifically, based on the MG rotation number calculated from the rotation angle detection value, whether or not the compression torque Qc and the prestart torque Qb are balanced with each other is determined. In the present embodiment, a rotation angle detection value having high detection accuracy is used to determine the balance of compression. Hence, the balance of compression can be determined with high accuracy.

In addition, the controller 20 measures a period of time elapsed from the time when the prestart torque Qb is outputted (S103). The controller 20 determines whether or not the compression torque Qc and the prestart torque Qb are balanced with each other based on the elapsed period of time (S105). According to the present embodiment, since it is determined that the compression is not balanced until a predetermined period of time passes, a state where the MG rotation number is smaller immediately after the MG 12 starts can be prevented from being erroneously determined that compression is balanced.

In the present embodiment, the controller 20 configures a prestart control means (section), a balance determination means (section), a start-up control means (section), a rotation angle detection means (section), and a time measurement means (section). In addition, S107 in FIG. 2 corresponds to a process serving as a function of the prestart control means. S105 corresponds to a process serving as a function of the balance determination means (section). S108 corresponds to a process serving as a function of the start-up control means (section). In addition, S104 corresponds to a process serving as a function of the rotation angle detection means (section). S103 corresponds to a process serving as a function of the time measurement means (section).

Second Embodiment

The second embodiment is described with reference to FIG. 4.

The system configuration of the second embodiment is similar to that of the first embodiment, but the start control process of the second embodiment differs from that of the first embodiment. Hence, the start control process of the second embodiment is mainly explained.

The start control process is explained based on a flowchart shown in FIG. 3. S201 to S203 are similar to S101 to S103 shown in FIG. 2.

In S204, the controller 20 determines whether or not a count value of the timer is less than an elapsed time determination threshold value Tth. If it is determined that the count value of the timer is not less than the elapsed time determination threshold value Tth (S204: NO), the controller 20 determines that compression is balanced. Next, in S205, the controller 20 sets the state transition flag. Then, the start control process proceeds to step S207. If it is determined that the count value of the timer is less than the elapsed time determination threshold value Tth (S204 YES), the controller 20 determines that compression is not balanced. Then, the start control process proceeds to step S206. S206 and S207 are similar to S107 and S108 shown in FIG. 2.

According to the present embodiment, the balance of compression is determined based on the period of time elapsed from the time when the prestart torque Qb is outputted. Hence, the balance of compression can be determined by a simple configuration.

In addition, the present embodiment provides advantages similar to those of the first embodiment.

In the present embodiment, S206 in FIG. 4 corresponds to a process serving as a function of the prestart control means (section). S204 corresponds to a process serving as a function of the balance determination means (section). S207 corresponds to a process serving as a function of the start-up control means (section). S203 corresponds to a process serving as a function of the time measurement means (section).

Third Embodiment

The start control process of the third embodiment is explained based on a flowchart shown in FIG. 5. S301 to S303 are similar to S101 to S103 in FIG. 2. In S304, a crank angle detection value is acquired from the crank angle sensor 11.

In S305, the controller 20 determines whether a count value so of the timer is less than the elapsed time determination threshold value Tth or a variation of the crank angle is more than a crank angle determination threshold value Cth concerning the variation of the crank angle. The variation of the crank angle may be, for example, the difference from the last value. The crank angle determination threshold value Cth is set to a value by which compression can be considered to be balanced. If it is determined that the count value of the timer is not less than the elapsed time determination threshold value Tth and a variation of the crank angle is not more than a crank angle determination threshold value Cth (S305: NO), the controller 20 determines that compression is balanced. Next, in S306, the controller 20 sets the state transition flag. Then, the start control process proceeds to step S308. If it is determined that the count value of the timer is less than the elapsed time determination threshold value Tth or a variation of the crank angle is more than the crank angle determination threshold value Cth (S305: YES), the controller 20 determines that compression is not balanced. Then, the start control process proceeds to step S307.

S307 and S308 are similar to S107 and S108 shown in FIG. 2.

In the present embodiment, the controller 20 acquires a crank angle detection value from the crank angle sensor 11 which detects a crank angle of the engine 10 (S304) to determine whether or not the compression torque Qc and the prestart torque Qb are balanced with each other based on the crank angle detection value (S305). Specifically, the valance of compression is determined based on a variation of the crank angle which is based on the crank angle detection value.

As described with reference to FIG. 3, when compression is balanced, variation of the crank angle becomes smaller. Hence, the balance of compression is determined based on the variation of the crank angle. Accordingly, the start control process can be performed in a unit other than the MG-ECU, for example, an engine ECU and a high-order ECU, which has not acquired information on the MG rotation number.

In this case, advantages similar to those of the above embodiment are provided.

In the present embodiment, the controller 20 configures, in addition to the means of the above embodiments, a crank angle acquisition means (section). In addition, S307 in FIG. 5 corresponds to a process serving as a function of the prestart control means. S305 corresponds to a process serving as a function of the balance determination means (section). S308 corresponds to a process serving as a function of the start-up control means (section). In addition, S304 corresponds to a process serving as a function of the crank angle acquisition means (section). S303 corresponds to a process serving as a function of the time measurement means (section).

Fourth Embodiment

The start control process of the fourth embodiment is explained based on a flowchart shown in FIG. 6.

In the flowchart shown in FIG. 6, S109 and S110 are performed between S105 and S107 of FIG. 2.

In S109, to which the start control process proceeds if affirmative determination is made in S105, that is, if it is determined that compression is not balanced, the controller 20 acquires a coolant temperature of the engine 10.

In S110, the controller 20 determines the prestart torque Qb by map calculation based on the coolant temperature of the engine 10. Then, the start control process proceeds to step S107. In the present embodiment, the coolant temperature of the engine 10 corresponds to a temperature of the engine.

Note that, in S109 and S110, an outside air temperature or a temperature of engine oil may be used instead of a coolant temperature of the engine 10. In this case, the outside air temperature or the temperature of engine oil corresponds to a temperature of the engine.

In addition, the balance of compression may be determined based on a count value of the timer as in the case of the second embodiment or based on the count value of the timer and a crank angle as in the case of the third embodiment.

In the present embodiment, the controller 20 acquires a coolant temperature of the engine 10 as a temperature of the engine 10 (S109) to calculate the prestart torque Qb based on the coolant temperature (S110).

The compression torque Qc varies depending on the temperature of the engine 10. The compression torque Qc is larger as the temperature is higher, and the compression torque Qc is smaller as the temperature is lower. Hence, by estimating the compression torque Qc based on the coolant temperature of the engine 10 to determine the prestart torque Qb, the piston can be stopped at a position where the prestart torque Qb and the compression torque Qs are more appropriately balanced with each other. Thereby, shock can be reduced when the engine starts.

In this case, advantages similar to those of the above embodiment are provided.

In the present embodiment, the controller 20 configures, in addition to the means of the above embodiments, an engine temperature acquisition means (section) and a prestart torque calculation means (section). In addition, S109 in FIG. 6 corresponds to a process serving as a function of the engine temperature acquisition means (section). S110 corresponds to a process serving as a function of the prestart torque calculation means (section).

Fifth Embodiment

Figure 7:
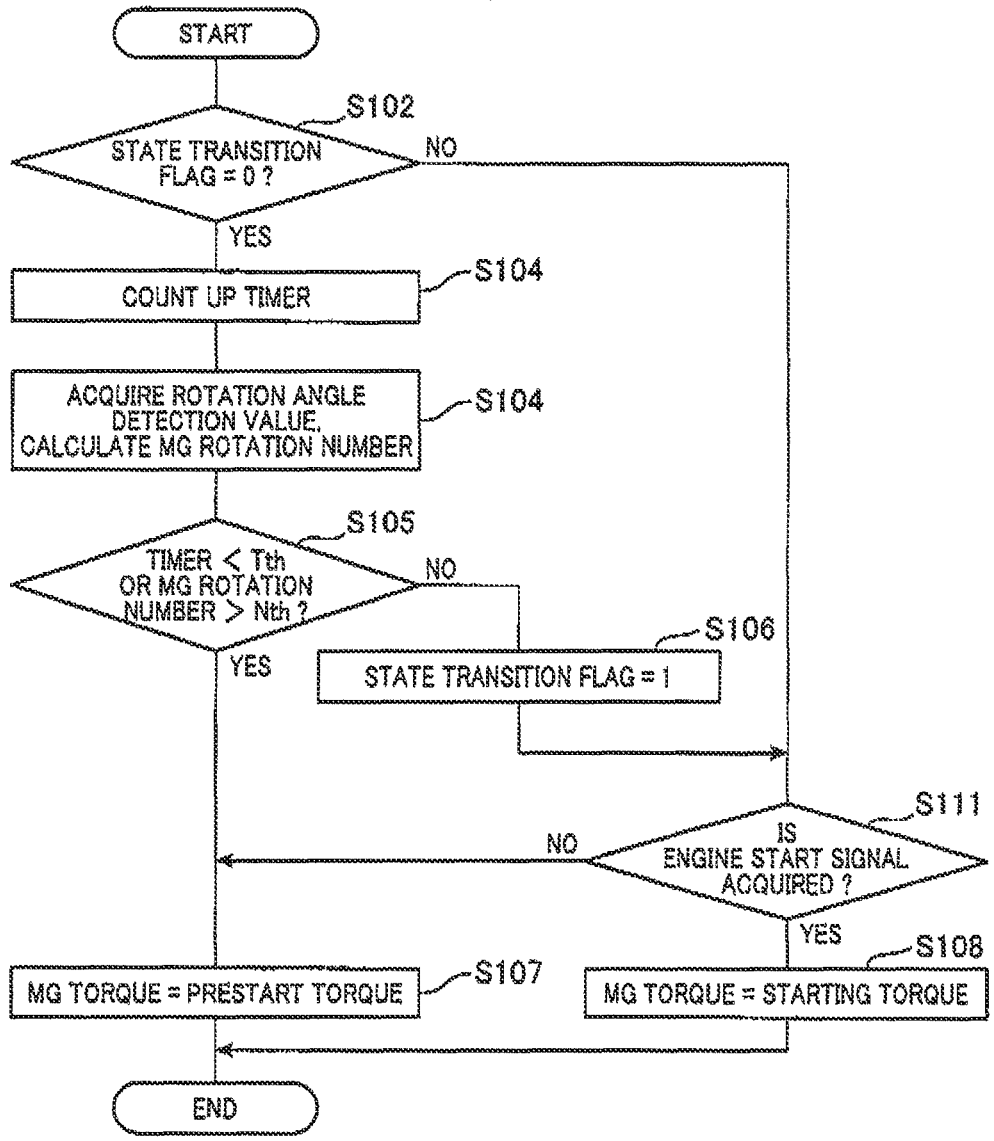
FIG. 7 is a flowchart for explaining a start control process according to a fifth embodiment.

The start control process of the fifth embodiment is explained based on a flowchart shown in FIG. 7. The process is performed when the engine 10 is stopped in a state, for example, idling stop, where an ignition power supply is in an on state.

In the flowchart shown in FIG. 7, S101 is omitted. S111 is added prior to S108.

In S111, to which the start control process proceeds when the state transition flag is set (S102: NO, or S105: NO, S106), the controller 20 determines whether or not an engine start signal is acquired. If it is determined that the engine start signal is not acquired (S111: NO), the start control process proceeds to step S107, in which the controller 20 uses the MG torque as the prestart torque Qb. If it is determined that the engine start signal is acquired (S111: YES), the start control process proceeds to step S108, in which the controller 20 uses the MG torque as the starting torque Qs.

Note that the balance of compression may be determined based on a count value of the timer as in the case of the second embodiment or based on the count value of the timer and a crank angle as in the case of the third embodiment. In addition, as in the case of the fourth embodiment, the prestart torque Qb may be changed based on the coolant temperature of the engine or the like.

In the present embodiment, before an engine start signal indicating the start of the engine 10 is acquired (S111: NO), the controller 20 makes the MG 12 output prestart torque (S107). That is, in the present embodiment, before the engine start signal is acquired, the controller 20 previously moves, by the prestart torque Qb, the piston to a position where the compression torque Qc and the prestart torque Qb are balanced with each other. When the engine start signal is acquired (S111: YES), MG torque is changed to the starting torque Qs. Hence, after an engine start signal is acquired, for example, during idling stop, shock can be reduced when the engine 10 starts, and the engine 10 can be quickly started.

In addition, advantages similar to those of the above embodiments can be provided.

Other Embodiments (a) Determination of Balance Based on the Rotation Angle Detection Value In the first embodiment, the balance of compression is determined based on the MG rotation number. In another embodiment, the balance of compression may be determined in any way based on the rotation angle detection value such as a variation of the rotation angle of the MG. In addition, although the rotation so angle sensor of the above embodiment is a resolver, sensors other than the resolver may be used.

In addition, when the rotation angle detection value is not used to determine the balance of compression, the rotation angle sensor may be omitted.

(b) Determination of Balance Based on the Crank Angle Detection Value

In the third embodiment, the balance of compression is determined based on a variation of the crank angle. When compression is balanced, the piston stops at a substantially fixed position. Hence, in another embodiment, compression may be determined to be balanced when the crank angle is in a predetermined range.

In addition, when the crank angle detection value is not used to determine the balance of compression, the crank angle sensor may be omitted.

(c) Vehicle Control System

The vehicle control system of the above embodiment has one motor generator. In another embodiment, a plurality of motor generators may be provided.

In the above embodiment, a controller (MG-ECU) controlling the MG configures the prestart control means (section), the balance determination means (section), and the start-up control means (section). In another embodiment, at least one of the prestart control means (section), the balance determination means (section), and the start-up control means (section) may be configured by a controller other than the MG-ECU (e.g. a hybrid ECU which is a high-order ECU controlling the whole vehicle control system, or an engine ECU controlling the engine).

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

The vehicle control apparatus (20) of the above embodiments controls a hybrid vehicle including an engine (10) and a motor generator (12), which serve as a driving source. In the hybrid vehicle (90), the engine can be started by starting torque outputted from the motor generator.

The vehicle control apparatus includes a prestart control section (S107, S206, S307), a balance determination section (S105, S204, S305), and a start-up control section (S108, S207, S308).

The prestart control section makes the motor generator output prestart torque smaller than the starting torque, before the engine is started by the starting torque.

The balance determination section determines whether or not compression torque caused by pressure in a cylinder of the engine and the prestart torque are balanced with each other.

The start-up control section makes the motor generator output the starting torque, after the balance determination section determines that the compression torque and the prestart torque are balanced with each other.

In the above embodiments, before the engine is started by the starting torque, the motor generator outputs the prestart torque to move the piston to the position where the prestart torque and the compression torque are balanced with each other. Then, the starting torque is applied at the crank position where the prestart torque and the compression torque are balanced with each other. Hence, torque variation due to the compression torque can be suppressed. Thereby, shock and vibration can be reduced when the engine starts.

What is claimed is:

1. A vehicle control apparatus which includes an engine and a motor generator, and controls a hybrid vehicle in which the engine is started by starting torque outputted from the motor generator, the apparatus comprising:

a prestart control section which makes the motor generator output prestart torque smaller than the starting torque, before the engine is started by the starting torque;

a balance determination section which determines whether or not compression torque caused by pressure in a cylinder of the engine and the prestart torque are balanced with each other, and a start-up control section which makes the motor generator output the starting torque, after the balance determination section determines that the compression torque and the prestart torque are balanced with each other.

2. The vehicle control apparatus according to claim 1, further comprising:

an engine temperature acquisition section which acquires a temperature of the engine; and a prestart torque calculation section which calculates the prestart torque based on the temperature of the engine.

3. The vehicle control apparatus according to claim 1, wherein the prestart control section makes the motor generator output the prestart torque after an engine start signal indicating start of the engine is acquired.

4. The vehicle control apparatus according to claim 1, wherein the prestart control section makes the motor generator output the prestart torque before an engine start signal indicating start of the engine is acquired.

5. The vehicle control apparatus according to claim 1, further comprising a rotation angle detection section which acquires a rotation angle detection value from a rotation angle sensor which detects a rotation angle of the motor generator, wherein the balance determination section determines whether or not the compression torque and the prestart torque are balanced with each other based on the rotation angle detection value.

6. The vehicle control apparatus according to claim 1, further comprising a crank angle acquisition section which acquires a crank angle detection value from a crank angle sensor which detects a crank angle of the engine, wherein the balance determination section determines whether or not the compression torque and the prestart torque are balanced with each other based on the crank angle detection value.

7. The vehicle control apparatus according to claim 1, further comprising a time measurement means section which measures a period of time elapsed from a time when the prestart torque is outputted, wherein the balance determination section determines whether or not the compression torque and the prestart torque are balanced with each other based on the elapsed period of time.

* * * * *